United States Patent
Cha et al.

(10) Patent No.: US 11,309,930 B2
(45) Date of Patent: Apr. 19, 2022

(54) METHOD FOR CONTROLLING ANTENNA CHARACTERISTICS AND AN ELECTRONIC DEVICE THEREOF

(71) Applicant: Samsung Electronics Co., Ltd., Gyeonggi-do (KR)

(72) Inventors: Jaemoon Cha, Gyeonggi-do (KR); Wonseob Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/702,681

(22) Filed: Dec. 4, 2019

(65) Prior Publication Data

US 2020/0177226 A1 Jun. 4, 2020

(30) Foreign Application Priority Data

Dec. 4, 2018 (KR) .......................... 10-2018-0154104

(51) Int. Cl.
*H04B 1/40* (2015.01)
*H04B 1/401* (2015.01)
*H04W 88/06* (2009.01)

(52) U.S. Cl.
CPC ............ *H04B 1/401* (2013.01); *H04W 88/06* (2013.01)

(58) Field of Classification Search
CPC ....... H04W 84/12; H04W 88/06; H04W 4/80; H04W 76/14; H04W 76/27; H04W 88/02; H04W 8/245; H04W 28/0247; H04B 1/401
See application file for complete search history.

(56) References Cited

U.S. PATENT DOCUMENTS

| | | | |
|---|---|---|---|
| 9,078,123 B1 * | 7/2015 | Benco | H04W 4/027 |
| 9,231,293 B2 | 1/2016 | Park et al. | |
| 2009/0239543 A1 * | 9/2009 | Kozu | H04W 12/03 |
| | | | 455/445 |
| 2012/0133840 A1 * | 5/2012 | Shirasuka | H04B 7/12 |
| | | | 348/732 |
| 2014/0228072 A1 | 8/2014 | Clark et al. | |
| 2014/0273887 A1 | 9/2014 | Black et al. | |
| 2014/0323065 A1 | 10/2014 | Lei | |
| 2016/0241319 A1 | 8/2016 | Kim et al. | |
| 2016/0380665 A1 | 12/2016 | Lee et al. | |
| 2017/0026103 A1 | 1/2017 | Huang et al. | |
| 2018/0316379 A1 * | 11/2018 | Chang | H04B 1/401 |

FOREIGN PATENT DOCUMENTS

KR    10-2013-0013089 A    2/2013

OTHER PUBLICATIONS

International Search Report dated Mar. 26, 2020.
European Search Report dated Oct. 21, 2021.

* cited by examiner

*Primary Examiner* — Nhan T Le
(74) *Attorney, Agent, or Firm* — Cha & Reiter, LLC.

(57) ABSTRACT

To control antenna characteristics in an electronic device, a method for operating the electronic device may include identifying communication states related to a first radio access technology (RAT) and a second RAT, determining a mode of a tuner which controls characteristics of an antenna for the second RAT, based on the communication states, and controlling the tuner according to the mode.

18 Claims, 14 Drawing Sheets

METHOD FOR CONTROLLING ANTENNA CHARACTERISTICS AND AN ELECTRONIC DEVICE THEREOF

CROSS-REFERENCE TO RELATED APPLICATION(S)

This application is based on and claims priority under 35 U.S.C. § 119 to Korean Patent Application No. 10-2018-0154104, filed on Dec. 4, 2018, in the Korean Intellectual Property Office, the disclosure of which is incorporated by reference herein in its entirety.

BACKGROUND

1. Field

One or more embodiments of the instant disclosure relate generally to a method and an electronic device for controlling antenna characteristics.

2. Description of Related Art

As technology has advanced, electronic devices such as smartphones have improved in performance and have increasingly become more complicated. As various communication systems are developed, these electronic devices also have evolved to support two or more radio access technologies (RATs). Conventionally, since different RATs use separate antennas, the electronic devices likely include a plurality of antennas.

With the inclusion of a plurality of the antennas, performance degradation may be caused by lack of isolation between the antennas due to a relatively small distance between the antennas. Interference between the antennas degrades performance of the communication circuits corresponding to the antennas.

SUMMARY

According to an embodiment of the disclosure, a method for operating an electronic device may include identifying communication states related to a first radio access technology (RAT) and a second RAT, determining a mode of a tuner which controls characteristics of an antenna for the second RAT, based on the communication states, and controlling the tuner according to the mode.

According to an embodiment of the disclosure, an electronic device may include a first communication circuit for a first RAT, a second communication circuit for a second RAT, a first antenna for the first RAT, a second antenna for the second RAT, a tuner for controlling characteristics of the first antenna and/or the second antenna, and a processor operatively coupled with the first communication circuit and the second communication circuit. The processor may be configured to identify communication states related to the first RAT and the second RAT, determine a mode of a tuner which controls characteristics of an antenna for the second RAT, based on the communication states, and control the tuner according to the mode.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

One or more embodiments of the instant disclosure may provide method and electronic device for improving communication performance by controlling antenna characteristics.

Hereinafter, various embodiments are described in detail by referring to the attached drawings.

Figure 1:
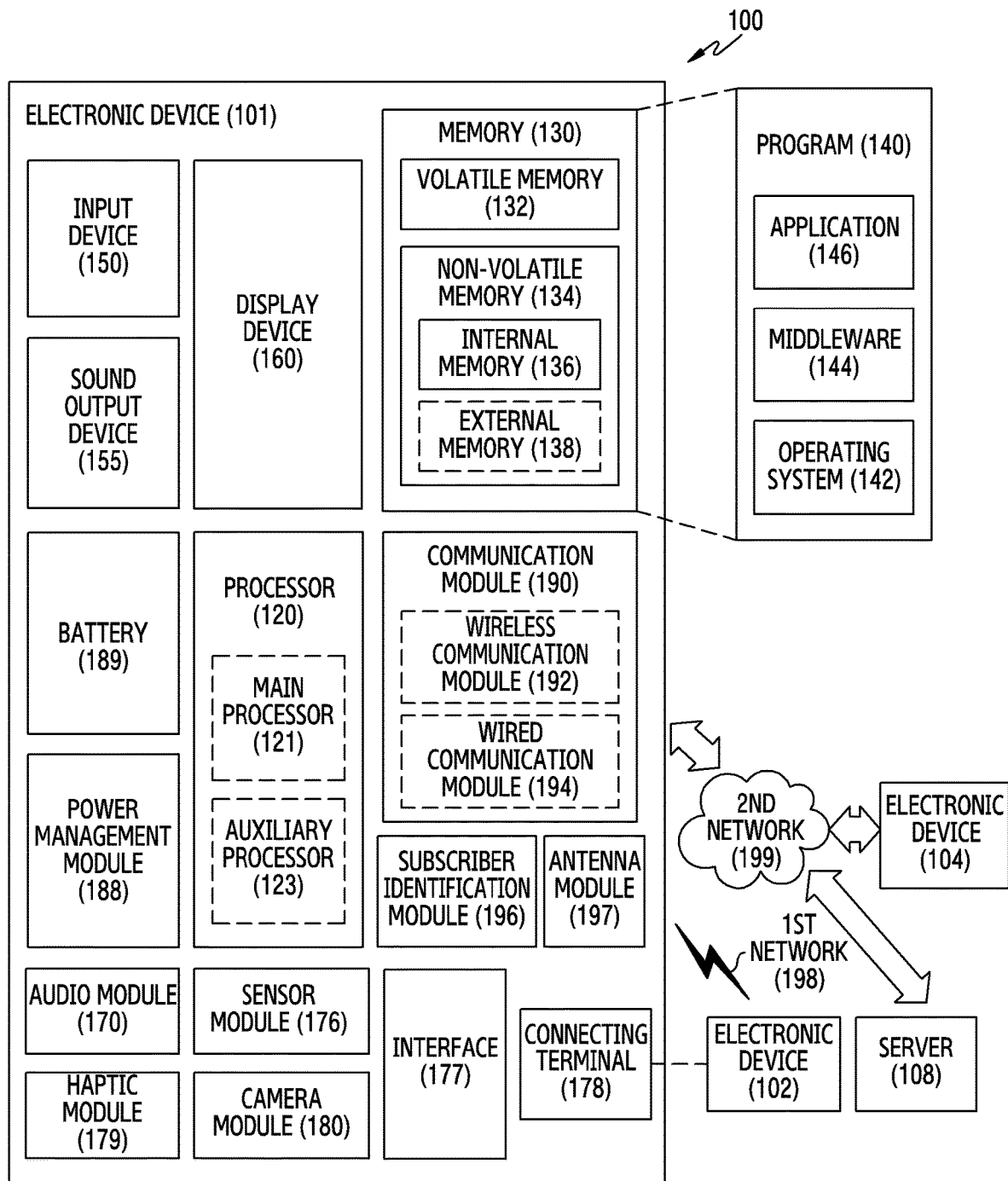
FIG. 1 illustrates a block diagram of an electronic device in a network environment according to an embodiment of the disclosure.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

In the electronic device 101 of FIG. 1, the communication module 190 may support a plurality of radio access technologies (RATs). For example, the communication module 190 may support cellular communication, wireless local area network, and/or short-range communication (e.g., Bluetooth). If the communication module 190 supports the multiple RATs, the antenna module 197 may include a plurality of antennas. For example, at least one dedicated antenna per RAT may be included. For example, the antennas may be disposed as shown in FIG. 2.

Figure 2:
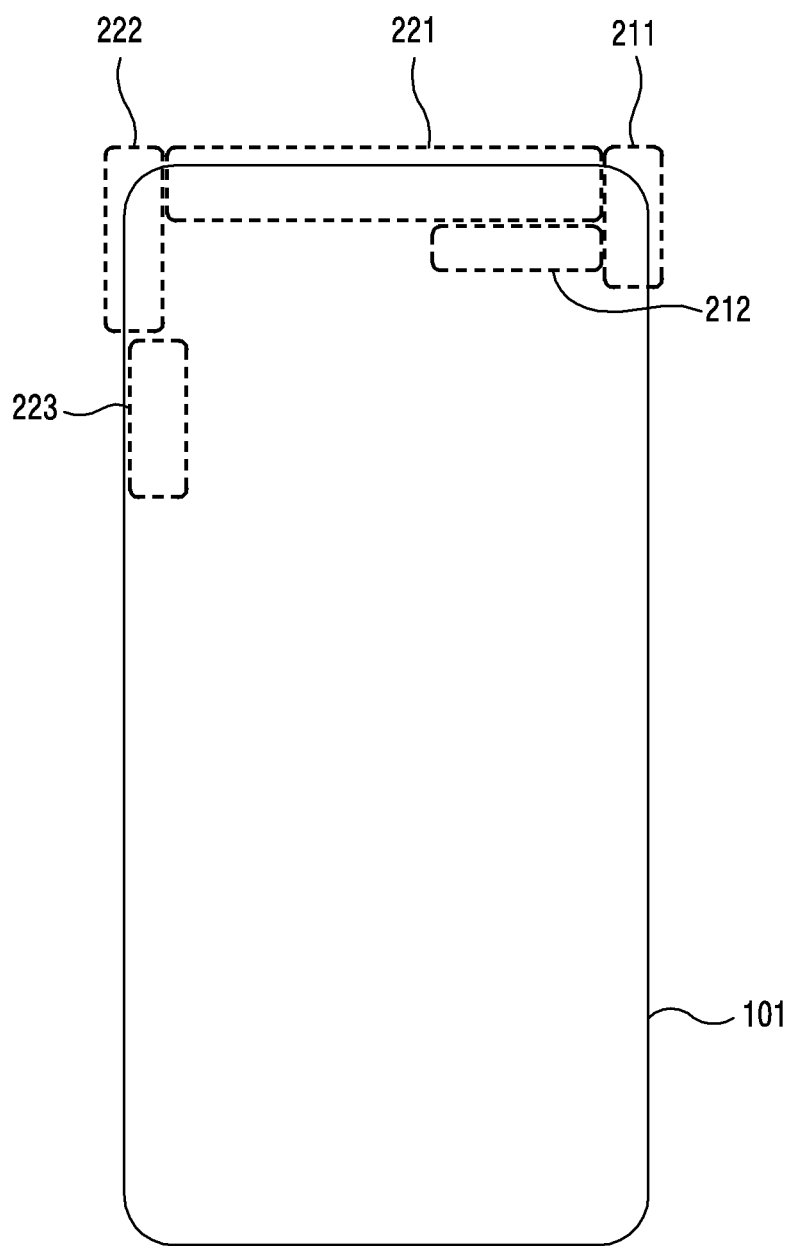
FIG. 2 is a view illustrating an example of positions of antennas in an electronic device according to an embodiment of the disclosure.

FIG. 2 is a view illustrating an example of positions of antennas in an electronic device 101 according to an embodiment of the disclosure. Referring to FIG. 2, antennas for a first RAT may be disposed in a first area 211 and a second area 212, and antennas for a second RAT may be disposed in a third area 221, a fourth area 222, and a fifth area 223. For example, the first RAT may be the wireless local area network, and the second RAT may be the cellular technology (e.g., long term evolution (LTE), LTE-advanced (LTE-A) or 5th generation (5G)). The antennas in the first area 211, the second area 212, the third area 221, the fourth area 222, and the fifth area 223 each may use laser direct structuring (LDS). Some of the antennas may be used in all of the bands of low band (LB), middle band (MB), and high band (HB), while other antennas may be used in only some of the bands of LB, the MB, or the HB.

If antennas are disposed in the areas 211 through 223 of FIG. 2, interference may occur between the antenna of the first area 211 and the antenna of the third area 221 because the first area 211 and the third area 221 are adjacent to each other. Further, if the cover of the electronic device 101 overlapping the antenna areas is metallic, interference between the antenna of the first area 211 and the antenna of the third area 221 may increase.

The antennas as disposed in FIG. 2 may be used to detect radio signals or to radiate radio signals. Each antenna has unique characteristics (e.g., impedance), and its performance may vary depending on the use of additional components. Hence, the characteristics of the antenna may be controlled by using at least one tuner. For example, the communication module 190 and the antenna module 197 including a tuner are shown in FIG. 3A or FIG. 3B.

Figure 3A:
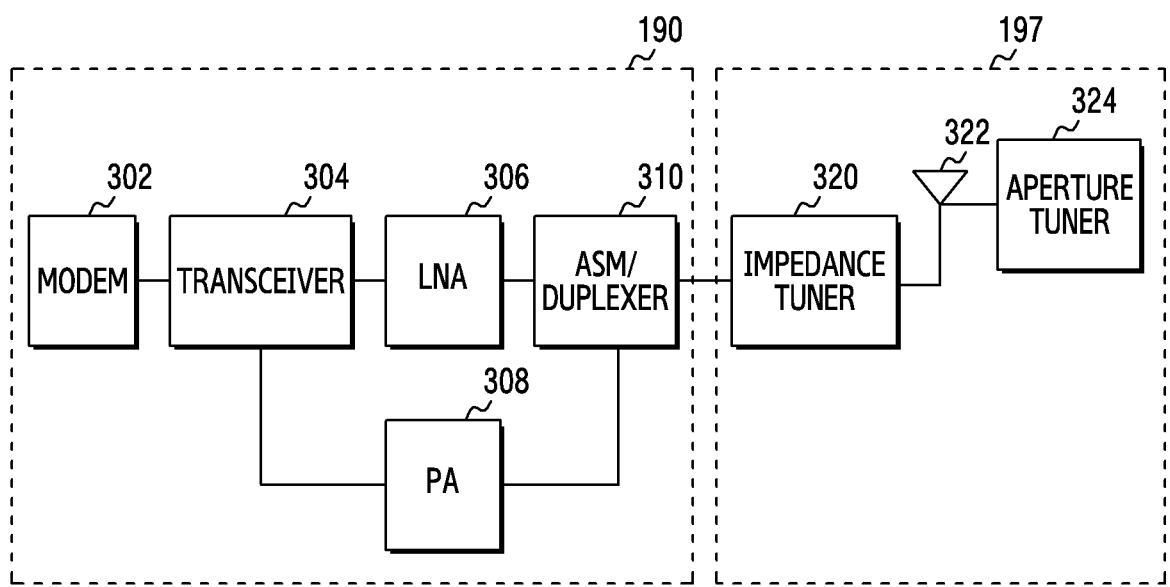
FIG. 3A is a block diagram illustrating a communication module and an antenna module having transmission functionality and reception functionality in an electronic device according to an embodiment of the disclosure.
Figure 3B:
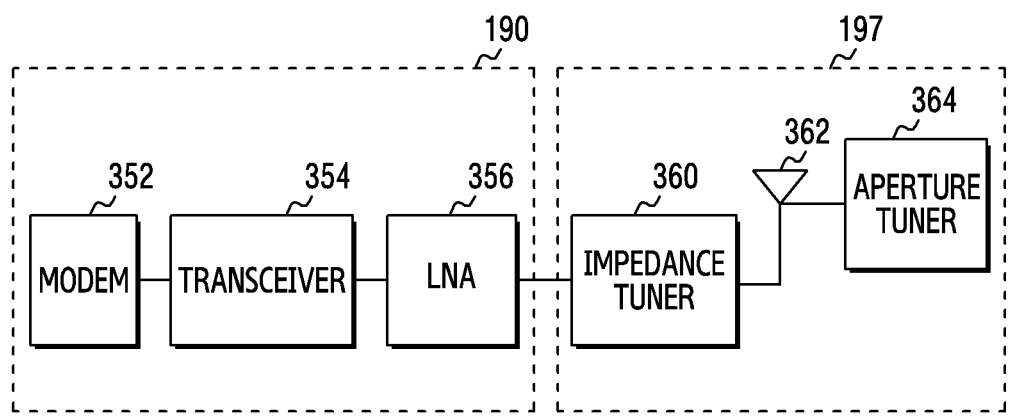
FIG. 3B is a block diagram illustrating the communication module and the antenna module having reception functionality in the electronic device according to an embodiment of the disclosure.

FIG. 3A is a block diagram illustrating a communication module 190 and an antenna module 197 having transmission functionality and reception functionality in an electronic device 101 according to an embodiment of the disclosure.

Referring to FIG. 3A, the communication module 190 may include a modem 302, a transceiver 304, a low noise amplifier (LNA) 306, a power amplifier (PA) 308, and/or an antenna switch module (ASM)/duplexer 310. The antenna module 197 may include an impedance tuner 320, an antenna 322, and/or an aperture tuner 324. The impedance tuner 320 and the aperture tuner 324 may be referred to collectively as an antenna tuner.

According to an embodiment, the modem 302 may channel-encode, channel-decode, modulate, and/or demodulate data. The transceiver 304 may perform conversion between digital and analog signals, and may convert the frequency of a signal. For doing so, the transceiver 304 may include a digital to analog converter (DAC), a mixer, and/or an oscillator. The LNA 306 may amplify a received signal, and the PA 308 may amplify a transmit signal. The ASM/duplexer 310 may enable a path to/from the PA 308 for signal transmission, and enable a path to/from the LNA 306 for signal reception.

According to an embodiment, the impedance tuner 320 may control impedance characteristics of the antenna 322. The impedance tuner 320 may include at least one capacitor, at least one inductor and/or at least one resistor. The impedance tuner 320 may add or subtract from the impedance of the antenna to minimize the reflection coefficient between the signal processing path and the antenna 322. Although not depicted in FIG. 3A, the impedance tuner 320 may form a specific impedance under control of other component (e.g., the modem 302). The impedance tuner 320 may be referred to as an impedance matching circuit.

According to an embodiment, the antenna 322 may be a conductor for radiating or detecting signals. The antenna 322 may be formed in a shape corresponding to the frequency of the signals that it is designed to process, and may be disposed at a specific position (e.g., the first area 211, the second area 212, the third area 221, the fourth area 222 or the fifth area 223) of the electronic device (e.g., the electronic device 101).

According to an embodiment, the aperture tuner 324 may control characteristics of the antenna 322. The aperture tuner 324 may include at least one capacitor, at least one inductor, at least one resistor and/or at least one switch. The aperture tuner 324 may be connected to the antenna 322 in a direction away from the signal processing path, as shown in the figure. The aperture tuner 324 may change the required circuit characteristic of the antenna to optimize the resonance frequency of the antenna 322.

FIG. 3B is a block diagram illustrating the communication module 190 and the antenna module 197 having reception functionality in the electronic device 101 according to an embodiment of the disclosure.

Referring to FIG. 3B, the communication module 190 may include a modem 352, a transceiver 354, and/or an LNA 356. The antenna module 197 may include an impedance tuner 360, an antenna 362, and/or an aperture tuner 364. The impedance tuner 360 and the aperture tuner 364 may be referred to as an antenna tuner. Compared with FIG. 3A, the communication module 190 and the antenna module 197 of FIG. 3B has no transmission functionality, and may not include a PA (e.g., the PA 308) and a duplex circuit (e.g., the ASM/duplexer 310).

According to an embodiment, the modem 332 may demodulate and/or channel-decode received data. The transceiver 354 may convert the frequency of a signal, and convert analog to digital signals or vice versa. For doing so, the transceiver 354 may include an analog to digital converter (ADC), a mixer, and/or an oscillator. The LNA 356 may amplify a received signal.

According to an embodiment, the impedance tuner 360 may control impedance characteristics of the antenna 362. The impedance tuner 360 may include at least one capacitor, at least one inductor and/or at least one resistor. The impedance tuner 360 may add or subtract from the impedance of the antenna to minimize the reflection coefficient between the signal processing path and the antenna 362. Although not depicted in FIG. 3B, the impedance tuner 360 may form a specific impedance under control of other component (e.g., the modem 352). The impedance tuner 360 may be referred to as an impedance matching circuit.

According to an embodiment, the antenna 362 may be a conductor for radiating or detecting signals. The antenna 362 may be formed in a shape corresponding to the frequency of the signals that it is designed to process, and may be disposed at a specific position (e.g., the first area 211, the second area 212, the third area 221, the fourth area 222 or the fifth area 223) of the electronic device (e.g., the electronic device 101).

According to an embodiment, the aperture tuner 364 may control characteristics of the antenna 362. The aperture tuner 364 may include at least one capacitor, at least one inductor, at least one resistor and/or at least one switch. The aperture tuner 364 may be connected to the antenna 362 in a direction away from the signal processing path, and may change the required circuit characteristic of the antenna to optimize the resonance frequency of the antenna 362.

Figure 3C:
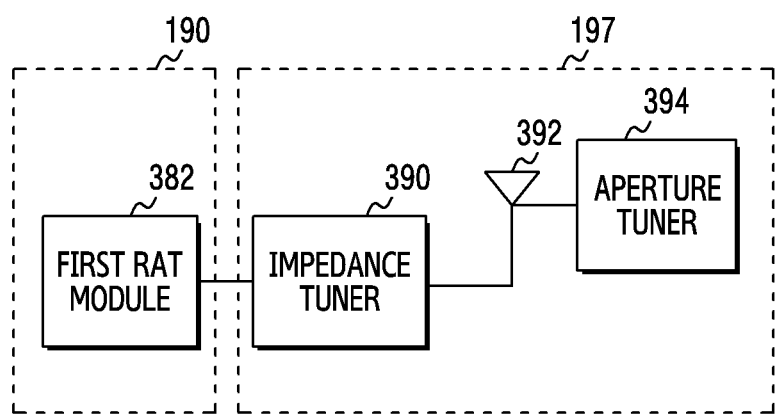
FIG. 3C is a block diagram illustrating the communication module and the antenna module in the electronic device according to an embodiment of the disclosure.

FIG. 3C is a block diagram illustrating the communication module 190 and the antenna module 197 in the electronic device 101 according to an embodiment of the disclosure. FIG. 3C illustrates a configuration example for the first RAT.

Referring to FIG. 3C, the communication module 190 may include a first RAT module 382. The antenna module 197 may include an impedance tuner 390, an antenna 392, and/or an aperture tuner 394. The impedance tuner 390 and the aperture tuner 394 may be referred to as an antenna tuner.

According to an embodiment, the first RAT module 382 may be a circuit for processing signals corresponding to the first RAT. For example, the first RAT module 382 may perform channel encoding/decoding, modulation/demodulation, DAC/ADC, frequency conversion and/or amplification.

According to an embodiment, the impedance tuner 390 may control impedance characteristics of the antenna 392. The impedance tuner 390 may include at least one capacitor, at least one inductor and/or at least one resistor. The impedance tuner 390 may add or subtract from the impedance of the antenna to minimize the reflection coefficient between a signal processing path and the antenna 392. Although not depicted in FIG. 3C, the impedance tuner 390 may form a specific impedance under control of other component (e.g., the first RAT module 382). The impedance tuner 390 may be referred to as an impedance matching circuit.

According to an embodiment, the antenna 392 may be a conductor for radiating or detecting signals. The antenna 392 may be formed in a shape corresponding to the frequency of the signals that it is designed to process, and may be disposed at a specific position (e.g., the first area 211, the second area 212, the third area 221, the fourth area 222 or the fifth area 223) of the electronic device (e.g., the electronic device 101).

According to an embodiment, the aperture tuner 394 may control characteristics of the antenna 392. The aperture tuner 394 may include at least one capacitor, at least one inductor, at least one resistor and/or at least one switch. The aperture tuner 394 may be connected to the antenna 392 in a direction away from the signal processing path, and may change the required circuit characteristic of the antenna to optimize the resonance frequency of the antenna 392.

As described in FIGS. 3A, 3B, and 3C, the antenna module 197 may include the antenna tuner that in turn includes the impedance tuner (e.g., the impedance tuner 320 of FIG. 3A, the impedance tuner 360 of FIG. 3B, or the impedance tuner 390 of FIG. 3C) and/or the aperture tuner (e.g., the aperture tuner 324 of FIG. 3A, the aperture tuner 364 of FIG. 3B, or the aperture tuner 394 of FIG. 3C). Using the antenna tuner, the characteristics of the antenna (e.g., the antenna 322 of FIG. 3A, the antenna 362 of FIG. 3B, or the antenna 392 of FIG. 3C) may be controlled. Certain embodiments for the aperture tuner of the antenna tuner are described in FIG. 4A and FIG. 4B, and certain embodiments for the impedance tuner are described in FIG. 4C.

Figure 4A:
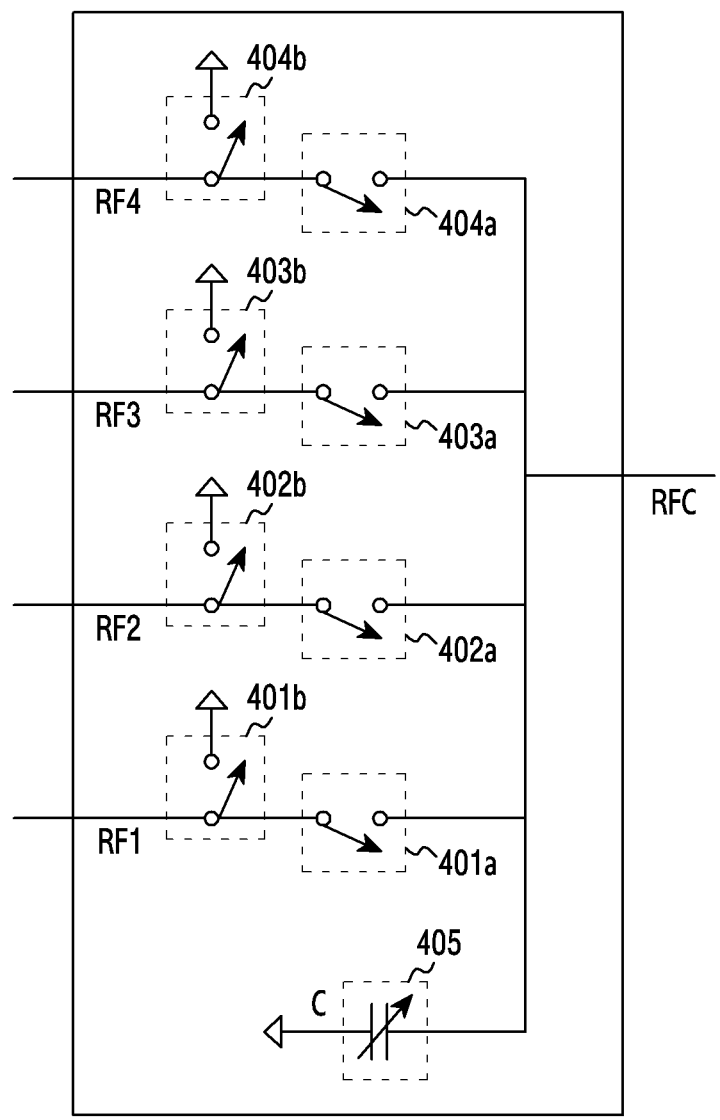
FIG. 4A is a circuit diagram illustrating an example of an aperture tuner in an electronic device according to an embodiment of the disclosure.
Figure 4B:
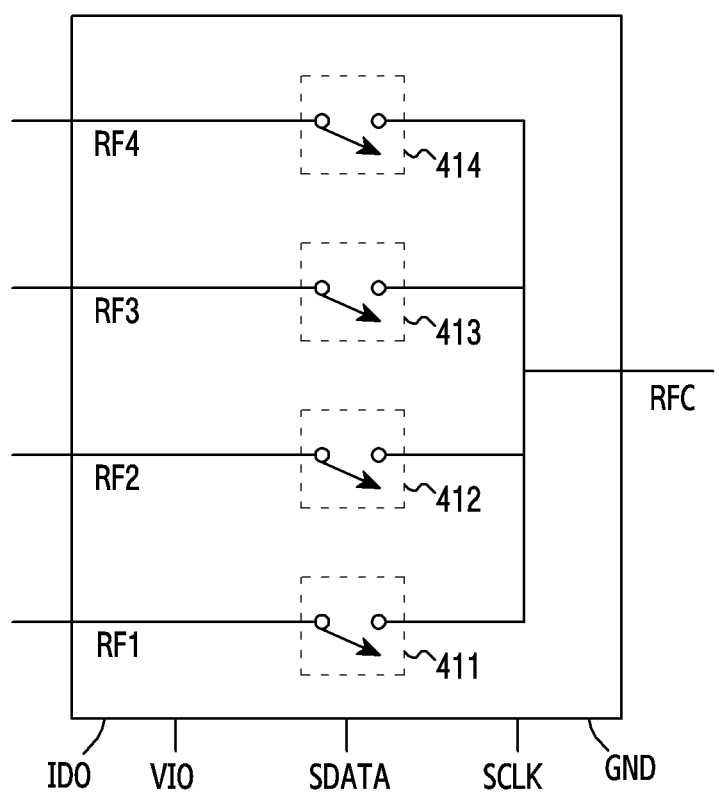
FIG. 4B is a circuit diagram illustrating an example of the aperture tuner in the electronic device according to an embodiment of the disclosure.

FIG. 4A and FIG. 4B are circuit diagrams illustrating examples of an aperture tuner (e.g., the aperture tuner 324 or the aperture tuner 364) in an electronic device according to an embodiment of the disclosure.

Referring to FIG. 4A, the aperture tuner according to an embodiment may include a port RFC for connecting with an antenna (e.g., the antenna 322 of FIG. 3A, the antenna 362 of FIG. 3B or the antenna 392 of FIG. 3C), ports RF1 through RF4 for connecting with different impedance circuits, switches 410a through 404b for selectively connecting the ports, and/or a variable capacitor 405 for controlling antenna characteristics. Depending on status of the switches 410a through 404b, the aperture tuner may change the antenna characteristics by electrically connecting at least some of the different impedance circuits and the variable capacitor 405 with the antenna via at least some of the ports RF1 through RF4. The impedance circuits connected to ports RF1 through RF4 are not shown, however they may be appropriately selected to generate the values shown in the Tables below.

Referring to FIG. 4B, the aperture tuner according to another embodiment may include a port RFC for connecting with the antenna (e.g., the antenna 322 of FIG. 3A, the antenna 362 of FIG. 3B or the antenna 392 of FIG. 3C), ports RF1 through RF4 for connecting with different impedance circuits, and/or switches 411 through 414 for selectively connecting the ports. Depending on the status of the switches 411 through 414, the aperture tuner may change the antenna characteristics by selectively and electrically connecting the antenna to the ports RF1 through RF4 which are connected with the different impedance circuits. In so doing, the status in which all of the switches 411 through 414 are opened and disconnected from the impedance circuits may be referred to as an isolation mode as shown in FIG. 4B, and the status in which only the first switch 411 is closed and connected to the first impedance circuit via the first port RF1 may be referred to as an RF1 mode, which is not depicted. The isolation mode may indicate that all of the switches are opened. According to an embodiment, the aperture tuner may further include at least one other port (e.g., IDO, VIO, SDATA, SCLK, GND) for power supply, ground and/or control.

Figure 4C:
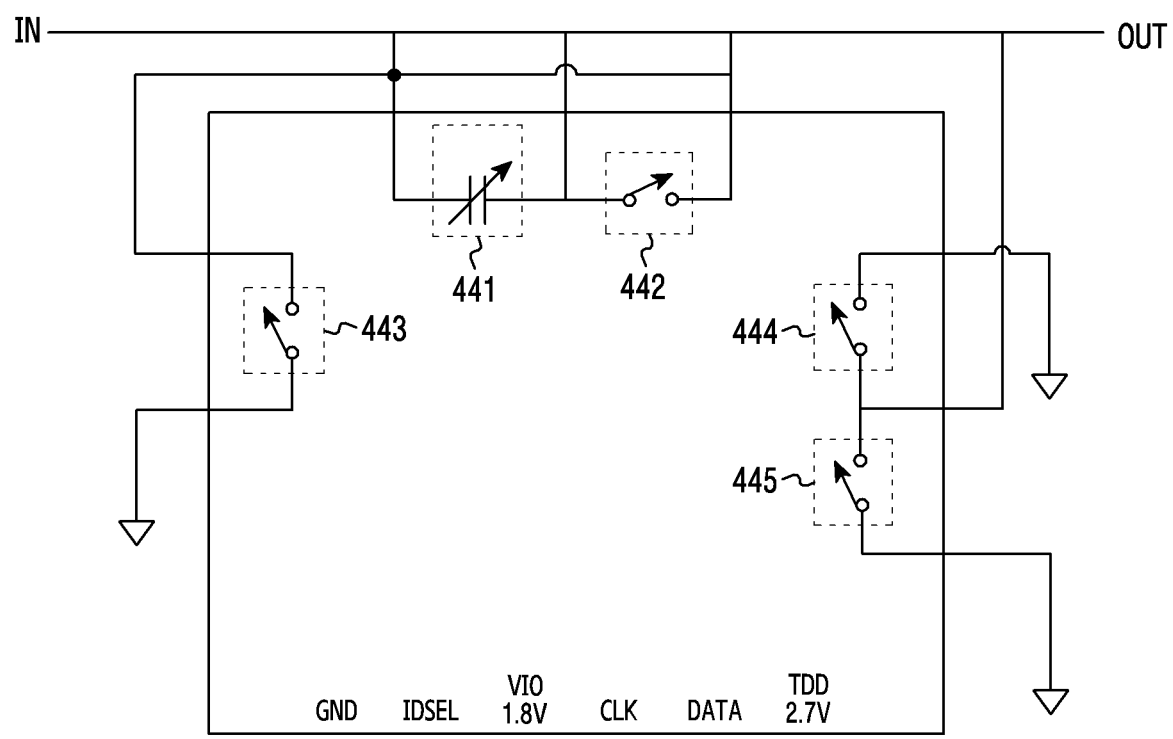
FIG. 4C is a circuit diagram illustrating an example of an impedance tuner in the electronic device according to an embodiment of the disclosure.

FIG. 4C is a circuit diagram illustrating an example of an impedance tuner in the electronic device according to an embodiment of the disclosure.

Referring to FIG. 4C, the impedance tuner according to an embodiment may include a port OUT for connecting with the antenna (e.g., the antenna 322 of FIG. 3A, the antenna 362 of FIG. 3B or the antenna 392 of FIG. 3C), a port IN for connecting with the signal processing path, a variable capacitor 441 for changing the impedance of the antenna, and/or a plurality of switches 442 through 445 for controlling the connections. The variable capacitor 441 may have the following 16 capacitance values that may be selected as shown in Table 1.

TABLE 1

| status | 1 | 2 | 3 | 4 | 5 | 6 | 7 | 8 |
|---|---|---|---|---|---|---|---|---|
| Cap [pF] | 0.42 | 0.59 | 0.77 | 0.94 | 1.12 | 1.29 | 1.46 | 1.64 |
| status | 9 | 10 | 11 | 12 | 13 | 14 | 15 | 16 |
| Cap [pF] | 1.82 | 1.99 | 2.17 | 2.34 | 2.52 | 2.69 | 2.86 | 3.04 |

Depending on the status of the switches 442 through 445 and the status of the variable capacitor 441, the impedance tuner may change impedance characteristics of the antenna. According to an embodiment, the impedance tuner may further include at least one other port (e.g., GND, IDSEL, VIO, CLK, DATA, TDD) for power supply, ground and/or control.

According to an embodiment, by controlling the antenna characteristics using the antenna tuner including the impedance tuner (e.g., the impedance tuner 320 or the impedance tuner 360) and/or the aperture tuner (e.g., the aperture tuner 324 or the aperture tuner 362), performance of the RAT or the communication circuit using the corresponding antenna may differ. For example, by controlling the antenna characteristics, the performance of the RAT or the communication circuit relating to other antenna disposed in vicinity may be affected. Table 2 through Table 9 show the effects of a first antenna (e.g., the antenna in the third area 221) on a second antenna (e.g., the antenna in the first area 211) among antennas disposed in adjacent areas (e.g., the first area 211 and the third area 221) as the characteristics of the first antenna are changed. In Table 2 through Table 9, the first row indicates a transmit beamforming angle of a transmitting device, and the first column indicates a receive beamforming angle of a receiving device (e.g., the electronic device 101).

Table 2 and Table 3 show reception sensitivity (e.g., total isotropic sensitivity (TIS)), if the antenna tuner of the first antenna is in a first mode (e.g., the isolation mode) according to an embodiment. Table 2 shows the TIS based on beamforming angle changes of the vertical axis, and Table 3 shows the TIS based on beamforming angle changes of the horizontal axis.

TABLE 2

| TIS | 30 | 60 | 90 | 120 | 150 |
|---|---|---|---|---|---|
| 0 | 76.00 | 76.50 | 78.00 | 77.00 | 76.00 |
| 30 | 74.00 | 74.00 | 77.00 | 76.00 | 79.50 |
| 60 | 81.00 | 78.00 | 77.00 | 77.00 | 82.00 |
| 90 | 86.00 | 85.00 | 82.50 | 82.00 | 81.50 |
| 120 | 87.50 | 86.50 | 86.50 | 86.00 | 83.50 |
| 150 | 85.00 | 84.50 | 84.50 | 84.00 | 80.00 |

TABLE 2-continued

| TIS | 30 | 60 | 90 | 120 | 150 |
|---|---|---|---|---|---|
| 180 | 78.00 | 75.00 | 74.50 | 75.00 | 76.50 |
| 210 | 81.50 | 80.50 | 80.50 | 81.50 | 82.00 |
| 240 | 87.00 | 86.00 | 86.00 | 86.50 | 85.00 |
| 270 | 87.50 | 85.00 | 83.00 | 84.00 | 82.50 |
| 300 | 84.00 | 80.00 | 75.50 | 77.50 | 81.00 |
| 330 | 77.50 | 77.50 | 80.00 | 79.50 | 80.00 |
| 360 | 76.00 | 76.50 | 78.00 | 77.00 | 76.50 |

TABLE 3

| TIS | 30 | 60 | 90 | 120 | 150 |
|---|---|---|---|---|---|
| 0 | 84.50 | 82.50 | 83.50 | 83.00 | 86.00 |
| 30 | 85.00 | 82.50 | 83.00 | 82.00 | 86.00 |
| 60 | 83.50 | 80.50 | 82.50 | 80.50 | 85.50 |
| 90 | 81.00 | 79.50 | 82.00 | 81.00 | 84.50 |
| 120 | 78.50 | 76.50 | 79.00 | 80.00 | 82.50 |
| 150 | 85.50 | 84.50 | 81.00 | 78.00 | 80.50 |
| 180 | 88.50 | 87.00 | 84.00 | 81.50 | 82.00 |
| 210 | 87.50 | 86.50 | 82.00 | 79.50 | 81.50 |
| 240 | 82.50 | 81.50 | 79.00 | 72.00 | 80.50 |
| 270 | 76.50 | 70.50 | 79.50 | 78.00 | 82.00 |
| 300 | 79.50 | 78.50 | 80.50 | 79.00 | 83.50 |
| 330 | 83.00 | 81.50 | 82.00 | 81.50 | 85.00 |
| 360 | 84.50 | 82.50 | 83.50 | 83.00 | 86.00 |

Table 4 and Table 5 show the reception sensitivity if the antenna tuner of the first antenna is in a second mode (e.g., a RF1 mode) according to an embodiment. Table 4 shows the TIS based on beamforming angle changes of the vertical axis, and Table 5 shows the TIS based on beamforming angle changes of the horizontal axis.

TABLE 4

| TIS | 30 | 60 | 90 | 120 | 150 |
|---|---|---|---|---|---|
| 0 | 76.00 | 77.00 | 78.00 | 76.50 | 76.00 |
| 30 | 72.00 | 73.00 | 77.50 | 76.50 | 79.00 |
| 60 | 72.00 | 64.00 | 76.00 | 76.50 | 81.00 |
| 90 | 78.50 | 74.50 | 74.00 | 68.50 | 81.50 |
| 120 | 82.50 | 81.50 | 81.00 | 77.00 | 81.00 |
| 150 | 82.50 | 81.50 | 81.50 | 79.00 | 77.50 |
| 180 | 78.50 | 75.50 | 75.00 | 75.50 | 76.50 |
| 210 | 80.50 | 79.50 | 79.00 | 75.00 | 72.00 |
| 240 | 83.50 | 83.00 | 82.00 | 77.00 | 79.00 |
| 270 | 83.00 | 78.50 | 75.50 | 71.50 | 80.50 |
| 300 | 79.50 | 73.50 | 76.50 | 76.00 | 79.50 |
| 330 | 77.50 | 78.50 | 80.50 | 78.50 | 79.00 |
| 360 | 76.00 | 77.00 | 78.00 | 76.50 | 76.00 |

TABLE 5

| TIS | 30 | 60 | 90 | 120 | 150 |
|---|---|---|---|---|---|
| 0 | 80.00 | 77.50 | 81.50 | 83.00 | 86.00 |
| 30 | 81.00 | 79.00 | 82.00 | 82.00 | 85.50 |
| 60 | 82.00 | 79.50 | 81.50 | 80.50 | 85.00 |
| 90 | 80.50 | 77.50 | 82.00 | 81.00 | 84.00 |
| 120 | 76.00 | 73.50 | 79.50 | 79.50 | 81.50 |
| 150 | 78.50 | 79.00 | 74.50 | 76.00 | 78.50 |
| 180 | 82.50 | 82.00 | 77.00 | 73.50 | 77.50 |
| 210 | 81.00 | 80.50 | 75.50 | 74.00 | 79.00 |
| 240 | 77.00 | 76.00 | 76.50 | 76.00 | 81.00 |
| 270 | 77.00 | 74.00 | 79.00 | 76.00 | 82.00 |
| 300 | 78.50 | 73.50 | 78.50 | 77.00 | 83.50 |
| 330 | 77.50 | 74.00 | 80.00 | 81.50 | 85.00 |
| 360 | 80.00 | 77.50 | 81.50 | 83.00 | 86.00 |

Table 6 and Table 7 show the reception sensitivity of the second antenna if the antenna tuner of the first antenna is in a third mode (e.g., a RF3 mode) according to an embodiment. Table 6 shows the TIS based on beamforming angle changes of the vertical axis, and Table 7 shows the TIS based on beamforming angle changes of the horizontal axis.

TABLE 6

| TIS | 30 | 60 | 90 | 120 | 150 |
|---|---|---|---|---|---|
| 0 | 76.00 | 76.50 | 78.00 | 76.50 | 76.00 |
| 30 | 74.50 | 74.00 | 77.50 | 76.00 | 79.50 |
| 60 | 81.50 | 78.50 | 77.00 | 77.50 | 82.00 |
| 90 | 86.00 | 85.00 | 82.50 | 82.00 | 81.50 |
| 120 | 87.50 | 87.00 | 87.00 | 86.00 | 83.50 |
| 150 | 85.00 | 84.00 | 84.00 | 84.00 | 80.50 |
| 180 | 78.00 | 75.50 | 74.50 | 75.00 | 76.50 |
| 210 | 81.50 | 80.50 | 81.50 | 82.00 | 82.00 |
| 240 | 87.50 | 86.50 | 86.00 | 86.50 | 85.00 |
| 270 | 87.00 | 85.00 | 82.50 | 84.00 | 83.00 |
| 300 | 84.50 | 80.00 | 75.50 | 77.50 | 80.50 |
| 330 | 77.00 | 77.00 | 80.50 | 79.50 | 80.00 |
| 360 | 76.00 | 76.50 | 78.00 | 76.50 | 76.00 |

TABLE 7

| TIS | 30 | 60 | 90 | 120 | 150 |
|---|---|---|---|---|---|
| 0 | 84.50 | 82.50 | 83.00 | 83.00 | 86.50 |
| 30 | 85.00 | 82.50 | 83.00 | 82.00 | 86.00 |
| 60 | 82.50 | 80.50 | 82.50 | 81.00 | 85.50 |
| 90 | 81.50 | 79.50 | 82.00 | 81.00 | 84.50 |
| 120 | 78.50 | 76.50 | 79.00 | 80.00 | 82.50 |
| 150 | 85.50 | 84.50 | 81.00 | 77.50 | 80.50 |
| 180 | 88.50 | 87.50 | 84.00 | 81.50 | 82.50 |
| 210 | 87.50 | 86.50 | 82.00 | 79.50 | 81.50 |
| 240 | 82.50 | 81.50 | 79.00 | 72.00 | 80.50 |
| 270 | 77.00 | 71.00 | 80.00 | 78.00 | 82.00 |
| 300 | 79.50 | 79.00 | 80.50 | 79.00 | 83.50 |
| 330 | 83.50 | 82.00 | 82.00 | 81.50 | 85.00 |
| 360 | 84.50 | 82.50 | 83.00 | 83.00 | 86.50 |

Table 8 and Table 9 show the reception sensitivity of the second antenna according to an embodiment, if the antenna tuner of the first antenna is in a fourth mode (e.g., a RF2+RF3 mode). Table 8 shows the TIS based on beamforming angle changes of the vertical axis, and Table 9 shows the TIS based on beamforming angle changes of the horizontal axis.

TABLE 8

| TIS | 30 | 60 | 90 | 120 | 150 |
|---|---|---|---|---|---|
| 0 | 76.00 | 76.50 | 78.00 | 76.50 | 76.50 |
| 30 | 74.00 | 73.50 | 77.00 | 76.00 | 79.00 |
| 60 | 81.00 | 78.00 | 77.00 | 77.00 | 81.50 |
| 90 | 86.00 | 85.00 | 82.50 | 82.00 | 82.50 |
| 120 | 87.00 | 87.00 | 86.50 | 86.00 | 84.00 |
| 150 | 84.50 | 84.00 | 84.00 | 84.00 | 80.50 |
| 180 | 78.50 | 75.00 | 74.00 | 75.00 | 76.50 |
| 210 | 81.50 | 80.50 | 80.50 | 82.00 | 82.00 |
| 240 | 87.00 | 86.50 | 86.00 | 86.00 | 85.00 |
| 270 | 87.00 | 85.00 | 83.00 | 84.00 | 83.00 |
| 300 | 84.50 | 79.50 | 76.00 | 77.00 | 80.00 |
| 330 | 77.00 | 77.00 | 80.00 | 79.50 | 79.50 |
| 360 | 76.00 | 76.50 | 78.00 | 76.50 | 76.50 |

TABLE 9

| TIS | 30 | 60 | 90 | 120 | 150 |
|---|---|---|---|---|---|
| 0 | 84.50 | 82.00 | 83.50 | 83.00 | 86.00 |
| 30 | 85.00 | 82.50 | 83.50 | 82.50 | 86.00 |

TABLE 9-continued

| TIS | 30 | 60 | 90 | 120 | 150 |
|---|---|---|---|---|---|
| 60 | 83.00 | 80.00 | 82.00 | 81.00 | 85.50 |
| 90 | 81.50 | 79.00 | 82.00 | 81.00 | 84.50 |
| 120 | 78.50 | 76.50 | 79.00 | 80.00 | 83.00 |
| 150 | 85.50 | 84.50 | 81.50 | 79.00 | 80.50 |
| 180 | 88.50 | 87.00 | 84.50 | 82.00 | 82.00 |
| 210 | 88.00 | 86.00 | 82.50 | 80.00 | 81.50 |
| 240 | 82.50 | 81.50 | 78.50 | 74.00 | 81.00 |
| 270 | 76.50 | 70.50 | 80.00 | 78.00 | 82.00 |
| 300 | 79.00 | 78.50 | 80.00 | 79.50 | 83.50 |
| 330 | 83.50 | 81.50 | 82.00 | 81.50 | 85.00 |
| 360 | 84.50 | 82.00 | 83.50 | 83.00 | 86.00 |

Based on the measurement results of Table 1 through Table 9, if the aperture tuner of the first antenna is in the isolation mode(e.g., the status in which all of the switches 411 through 414 are opened and disconnected from the impedance circuits), the RF1 mode (e.g., the status in which only the first switch 411 is closed and connected to the first impedance circuit via the first port RF1), the RF3 mode(e.g., the status in which only the third switch 413 is closed and connected to a third impedance circuit via the third port RF3), and the RF2+RF3 mode(e.g., the status in which the second switch 412 and the third switch 413 are closed and connected to a second impedance circuit and a third impedance circuit via the second port RF2 and the third port RF 3), the average reception sensitivity of the second antenna is 85.35, 82.26, 85.43, and 85.37. As such, as the characteristics of the first antenna are changed, such changes may affect the performance of the second antenna.

According to an embodiment, if two antennas are disposed to be close, characteristics of one antenna may affect the performance of the other antenna. If the two antennas are used for different RATs, the antenna characteristics for the second RAT (e.g., cellular) may affect the performance of the first RAT (e.g., wireless local area network, Bluetooth or global positioning system (GPS)). The antenna characteristics for the second RAT affect the performance of the first RAT due to interference from a signal for the second RAT, whose characteristics vary according to the antenna characteristics (e.g., isolation characteristics).

According to an embodiment, the antenna characteristics for the second RAT may depend on the mode of the corresponding antenna tuner. For example, if the aperture tuner of FIG. 4B and the impedance tuner of FIG. 4C are used, the performances of the first RAT and the second RAT, which may vary depending on the modes of the aperture tuner and the impedance tuner, are shown in Table 10 through Table 15.

Table 10, Table 11, and Table 12 show performance degradation levels of the second RAT based on the modes of the impedance tuner according to an embodiment. In Table 10, Table 11, and Table 12, numerals in the third row through the twelfth row may indicate the degradation level of the antenna reception sensitivity in decibel (dB) for various frequencies.

TABLE 10

| Mode of the aperture tuner | 1 | | | | | | |
|---|---|---|---|---|---|---|---|
| Mode of the impedance tuner | 1 | 2 | 3 | 4 | 5 | 6 | 7 |
| 700 MHz | 10 | 6 | 7 | 3 | 12 | 5 | 6 |
| 800 MHz | 11 | 7 | 8 | 4 | 13 | 3 | 5 |
| 900 MHz | 12 | 8 | 9 | 5 | 14 | 3 | 4 |
| 1700 MHz | 17 | 13 | 4 | 10 | 19 | 9 | 10 |

TABLE 10-continued

| Mode of the aperture tuner | 1 | | | | | | |
|---|---|---|---|---|---|---|---|
| Mode of the impedance tuner | 1 | 2 | 3 | 4 | 5 | 6 | 7 |
| 1800 MHz | 18 | 14 | 15 | 11 | 20 | 10 | 11 |
| 1900 MHz | 12 | 8 | 9 | 5 | 14 | 7 | 8 |
| 2100 MHz | 14 | 10 | 11 | 7 | 16 | 6 | 7 |
| 2500 MHz | 16 | 12 | 13 | 9 | 18 | 5 | 6 |
| 2600 MHz | 17 | 13 | 14 | 10 | 19 | 15 | 16 |
| 3500 MHz | 27 | 23 | 24 | 20 | 29 | 17 | 18 |

TABLE 11

| Mode of the aperture tuner | 1 | | | | | | |
|---|---|---|---|---|---|---|---|
| Mode of the impedance tuner | 1 | 2 | 3 | 4 | 5 | 6 | 7 |
| 700 MHz | 10 | 13 | 14 | 17 | 19 | 9 | 10 |
| 800 MHz | 11 | 14 | 15 | 18 | 20 | 10 | 11 |
| 900 MHz | 5 | 8 | 9 | 12 | 14 | 7 | 8 |
| 1700 MHz | 7 | 10 | 11 | 14 | 16 | 6 | 7 |
| 1800 MHz | 5 | 6 | 7 | 10 | 12 | 5 | 6 |
| 1900 MHz | 4 | 7 | 8 | 11 | 13 | 4 | 5 |
| 2100 MHz | 5 | 8 | 9 | 12 | 14 | 3 | 4 |
| 2500 MHz | 10 | 13 | 14 | 17 | 19 | 5 | 6 |
| 2600 MHz | 12 | 15 | 16 | 19 | 21 | 18 | 16 |
| 3500 MHz | 6 | 11 | 5 | 15 | 17 | 17 | 18 |

TABLE 12

| Mode of the aperture tuner | 1 | | | | | | |
|---|---|---|---|---|---|---|---|
| Mode of the impedance tuner | 1 | 2 | 3 | 4 | 5 | 6 | 7 |
| 700 MHz | 19 | 13 | 14 | 17 | 10 | 9 | 10 |
| 800 MHz | 20 | 14 | 15 | 18 | 11 | 10 | 11 |
| 900 MHz | 14 | 8 | 9 | 12 | 5 | 7 | 8 |
| 1700 MHz | 16 | 10 | 11 | 14 | 7 | 6 | 7 |
| 1800 MHz | 12 | 6 | 7 | 0 | 3 | 5 | 6 |
| 1900 MHz | 13 | 9 | 8 | 11 | 7 | 4 | 5 |
| 2100 MHz | 15 | 9 | 10 | 13 | 8 | 3 | 4 |
| 2500 MHz | 19 | 13 | 14 | 17 | 10 | 5 | 6 |
| 2600 MHz | 21 | 15 | 16 | 19 | 12 | 15 | 16 |
| 3500 MHz | 12 | 3 | 4 | 10 | 3.5 | 17 | 18 |

Referring to Table 10, Table 11, and Table 12, according to an embodiment, in the 800 MHz band, the performance of the second RAT may be maximized by combining of the sixth mode of the impedance tuner and the first mode of the aperture tuner, corresponding to the smallest performance degradation of 3 dB. Referring to FIG. 4B, the first mode of the aperture tuner may be defined by closing the first switch 411 and connecting the impedance circuit via the first port RF1. Referring to FIG. 4C, the sixth mode of the impedance tuner may refer to the state where the variable capacitor 441 is set to a first value (e.g., 1.12 pF) and the first switch 442 is closed.

Table 13, Table 14, and Table 15 show performance degradation levels of the second RAT and performance degradation levels of the first RAT in the 800 MHz band depending on the modes of the impedance tuner according to an embodiment. In Table 13, Table 14, and Table 15, numerals in the third row and the fourth row may indicate the degradation level of the antenna reception sensitivity based on dB.

TABLE 13

| Mode of the aperture tuner | 1 | | | | | | |
|---|---|---|---|---|---|---|---|
| Mode of the impedance tuner | 1 | 2 | 3 | 4 | 5 | 6 | 7 |
| the first RAT | 6 | 7 | 6 | 4 | 5 | 5 | 3 |
| the second RAT (800MHz) | 11 | 7 | 8 | 4 | 13 | 3 | 5 |

TABLE 14

| Mode of the aperture tuner | 1 | | | | | | |
|---|---|---|---|---|---|---|---|
| Mode of the impedance tuner | 1 | 2 | 3 | 4 | 5 | 6 | 7 |
| the first RAT | 6 | 7 | 6 | 4 | 5 | 5 | 2 |
| the second RAT (800 MHz) | 11 | 14 | 15 | 18 | 20 | 10 | 11 |

TABLE 15

| Mode of the aperture tuner | 1 | | | | | | |
|---|---|---|---|---|---|---|---|
| Mode of the impedance tuner | 1 | 2 | 3 | 4 | 5 | 6 | 7 |
| the first RAT | 6 | 7 | 6 | 4 | 5 | 5 | 3 |
| the second RAT (800 MHz) | 20 | 14 | 15 | 18 | 11 | 10 | 11 |

Referring to Table 13, Table 14, and Table 15, according to an embodiment, the performance of the first RAT may be maximized by combining of the seventh mode of the impedance tuner and the first mode of the aperture tuner, corresponding to the performance degradation of 2 dB. Referring to FIG. 4B, the second mode of the aperture tuner may refer to the state where the second switch 412 is closed to connect the impedance circuit via the second port RF2. Referring to FIG. 4C, the seventh mode of the impedance tuner may refer to the state where the variable capacitor 441 is set to a second value (e.g., 1.99 pF) and the switch 444 is closed.

According to an embodiment, from the modes of the impedance tuner and the modes of the aperture tuner connected to the antenna for the second RAT, the best mode (e.g., the mode with the minimum performance degradation of the antenna for the first RAT) combination for the first RAT and the best mode (e.g., the mode with the minimum performance degradation of the antenna for the second RAT) combination for the second RAT may be acquired. Although the specific circuit implementation is different in FIG. 4B and FIG. 4C, the mode combination for maximizing the performance of the first RAT and the mode combination for maximizing the performance of the second RAT may be acquired in either implementation. The specific mode control state may vary according to the implementation of the impedance tuner and the aperture tuner, and the mode combination for maximizing the performance of each RAT may be determined by circuit design.

According to an embodiment of the disclosure, an electronic device (e.g., the electronic device 101) may include a first communication circuit for a first RAT; a second communication circuit for a second RAT, a first antenna for the first RAT, a second antenna for the second RAT, a tuner for controlling characteristics of the first antenna and/or the second antenna, and a processor operatively coupled with the first communication circuit and the second communication circuit, wherein the processor may be configured to identify communication states related to the first RAT and the second RAT, determine a mode of a tuner which controls characteristics of an antenna for the second RAT, based on the communication states, and control the tuner according to the mode.

According to an embodiment of the disclosure, if the first RAT is connected, the second antenna for the second RAT is enabled, and a voice or video call service is provided using the second RAT, the processor (e.g., the processor 120) may select a mode which maximizes performance of the second RAT. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment of the disclosure, if the first RAT is connected, the second antenna for the second RAT is enabled, and a communication environment of the second RAT is a weak electric field, the processor (e.g., the processor 120) may select a mode which maximizes performance of the second RAT.

According to an embodiment of the disclosure, if the first RAT is connected, the second antenna for the second RAT is enabled, a voice or video call service is not provided using the second RAT, and a voice over Internet protocol (VoIP) service is provided using the first RAT, the processor (e.g., the processor 120) may select a mode which maximizes performance of the first RAT.

According to an embodiment of the disclosure, if the first RAT is connected, the second RAT is idle, the second antenna for the second RAT is enabled, and a communication environment in previous paging of the second RAT is a weak electric field, the processor (e.g., the processor 120) may select a mode which maximizes performance of the second RAT.

According to an embodiment of the disclosure, if the first RAT is connected, the second RAT is idle, and the second antenna for the second RAT is not enabled, the processor (e.g., the processor 120) may select a mode which maximizes performance of the first RAT.

According to an embodiment of the disclosure, if the first RAT is connected, the second RAT is idle, the second antenna for the second RAT is enabled, and a communication environment in previous paging of the second RAT is not a weak electric field, the processor (e.g., the processor 120) may select one of at least one other mode other than a first mode which maximizes performance of the first RAT and a second mode which maximizes performance of the second RAT.

Now, the disclosure provides certain embodiments for controlling antenna characteristics of an electronic device using modes which maximize performance of each RAT. In the following, the mode for maximizing the performance of the first RAT may be referred to as the first mode, and the mode for maximizing the performance of the second RAT may be referred to as the second mode. At least one other mode than the first mode and the second mode may be referred to as the third mode.

Figure 5:
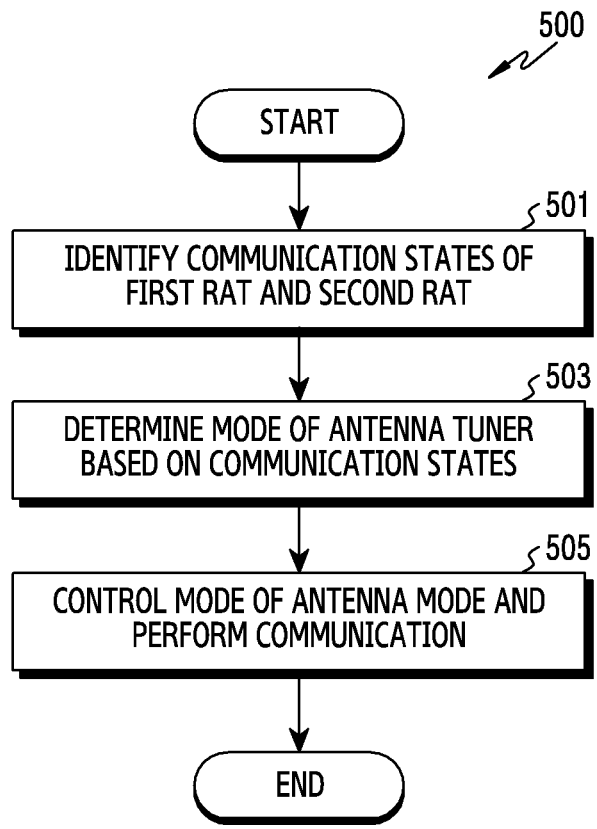
FIG. 5 is a flowchart illustrating the controlling of antenna characteristics in an electronic device according to an embodiment of the disclosure.

FIG. 5 is a flowchart 500 illustrating the controlling of antenna characteristics in an electronic device according to an embodiment of the disclosure. The operation entity of the flowchart 500 of FIG. 5 may be the electronic device 101 or a component (e.g., the processor 120) of the electronic device 101.

Referring to FIG. 5, according to an embodiment, in operation 501, the electronic device 101 (or the processor 120) may identify communication states of the first RAT and the second RAT. For example, the first RAT may be the wireless local area network, Bluetooth or GPS, and the second RAT may be cellular (e.g., LTE, LTE-A or 5G). The communication state may include at least one of whether a communication function of the corresponding RAT is activated, an operation mode (e.g., connected mode, idle mode, inactive mode, or discontinuous reception (DRX) mode), a serviced application (e.g., voice call, video call, or high-priority application), an electric field strength, or antenna enable. If the processor for managing the first RAT and the processor (e.g., communication processor (CP)) for managing the second RAT are different, the processor for managing the second RAT may receive event information of the first RAT from an application processor (AP) and thus obtain the communication state of the first RAT.

According to an embodiment, in operation 503, the electronic device 101 may determine the mode of the antenna tuner based on the communication states. According to an embodiment, in determining the mode of the antenna tuner for the second RAT, the electronic device 101 may consider not only the communication state of the second RAT but also the communication state of the first RAT. According to another embodiment, in determining the mode of the antenna tuner for the second RAT, the electronic device 101 may exclude the communication state of the second RAT but consider only the communication state of the first RAT. The determined mode may be the first mode optimized for the first RAT, the second mode optimized for the second RAT, or the third mode.

According to an embodiment, in operation 505, the electronic device 101 may control the mode of the antenna mode and perform communication. According to the determined mode in operation 503, the electronic device 101 may control the mode of the antenna tuner, for example, the modes of the impedance tuner and/or the aperture tuner and perform the communication in the controlled mode. The communication may include signal transmission or reception using at least one of the first RAT or the second RAT.

In the embodiment of FIG. 5, the antenna characteristics for the second RAT may be controlled based on the communication states of the first RAT and the second RAT. The antenna characteristics may be controlled according to a predefined priority, and a situation having the priority may be defined based on at least one of whether the communication function of the corresponding RAT is activated, the operation mode, the serviced application, the electric field strength, or whether the antenna is enabled. For example, the priority may be defined as shown in Table 16, Table 17, Table 18, or Table 19.

TABLE 16

| Priority | Conditions and RATs |
| --- | --- |
| 1 | The second RAT, if a voice call service or a video call service of the second RAT is provided. |
| 2 | The second RAT, if during paging of the second RAT, communication environment during previous paging is a weak electric field environment. |
| 3 | The first RAT, if, using the first RAT, VoIP (Voice over Internet Protocol Service) is provided or a high-priority application is performed. |

TABLE 17

| Priority | Conditions and RATs |
| --- | --- |
| 1 | The second RAT, if communication environment of the second RAT is a weak electric field environment. |
| 2 | The second RAT, if during paging of the second RAT, the communication environment during previous paging is a weak electric field environment. |
| 3 | The first RAT, if, using the first RAT, VoIP is provided or a high-priority application is performed. |

TABLE 18

| Priority | Conditions and RATs |
| --- | --- |
| 1 | The second RAT, if a voice call service or a video call service of the second RAT is provided. |
| 2 | The first RAT, if, using the first RAT, VoIP is provided or a high-priority application is performed. |
| 3 | The second RAT, if during paging of the second RAT, the communication environment during previous paging is a weak electric field environment. |

TABLE 19

| Priority | Conditions and RATs |
| --- | --- |
| 1 | The second RAT, if during paging of the second RAT, the communication environment during previous paging is a weak electric field environment. |
| 2 | The first RAT, if, using the first RAT, VoIP is provided or a high-priority application is performed. |
| 3 | The second RAT, if during paging of the second RAT, the communication environment during previous paging is a weak electric field environment. |

Other priority may also be defined. Now, embodiments with the priority of Table 16 or Table 17, for example, are explained.

Figure 6:
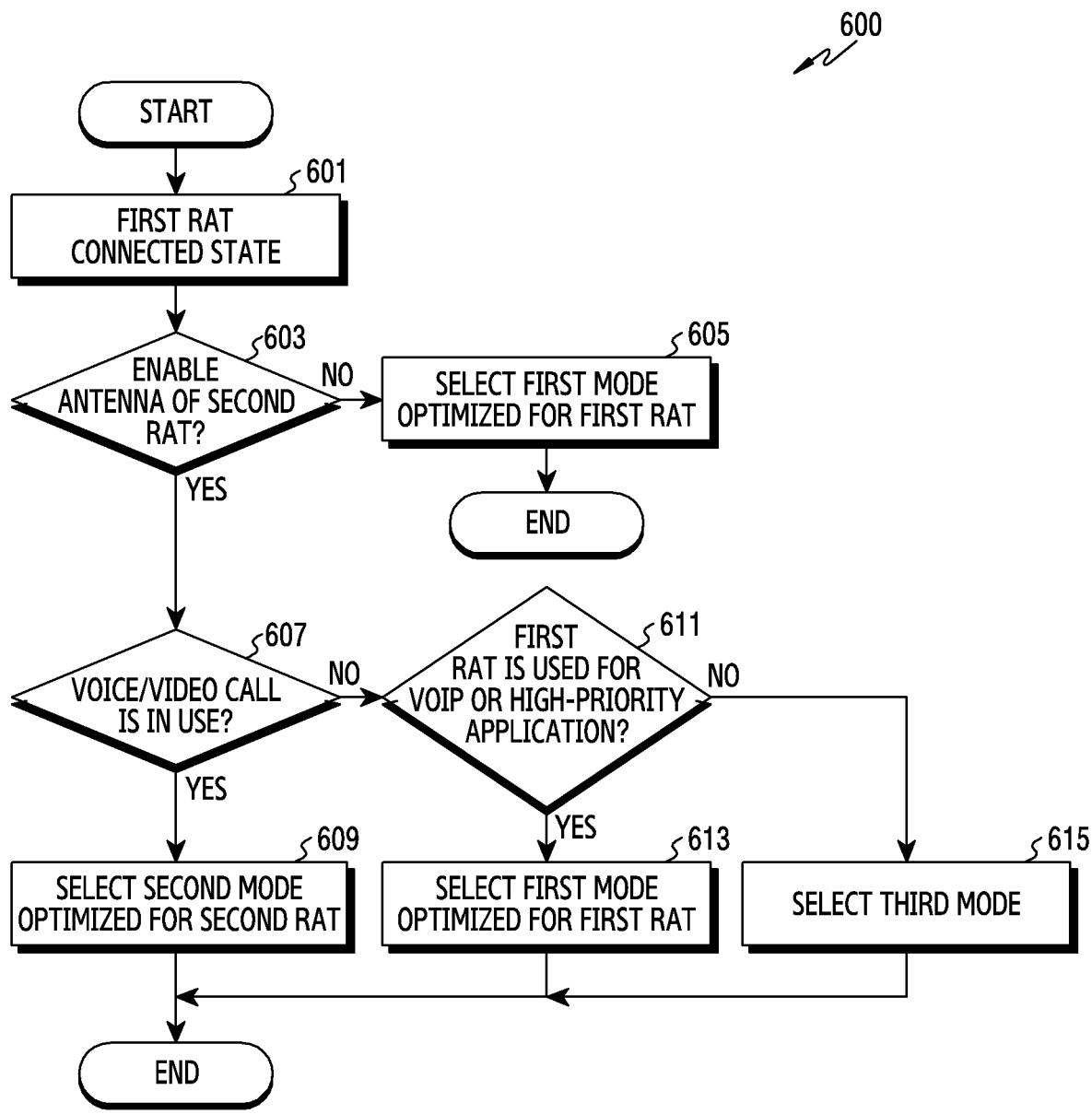
FIG. 6 is a flowchart illustrating the controlling of antenna characteristics while a second radio access technology (RAT) is active in an electronic device according to an embodiment of the disclosure.

FIG. 6 is a flowchart illustrating the controlling of antenna characteristics while a second RAT is active in an electronic device according to an embodiment of the disclosure. The flowchart 600 of FIG. 6 is an embodiment for determining the operation mode of the antenna tuner of the antenna for the second RAT, and the operation entity of the flowchart 600 may be the electronic device 101 or a component (e.g., the processor 120) of the electronic device 101.

Referring to FIG. 6, according to an embodiment, in operation 601, the electronic device 101 (or the processor 120) may operate in the connected state for the first RAT. That is, the electronic device 101 may operate while a communication channel using the first RAT is established.

According to an embodiment, in operation 603, the electronic device 101 may identify whether the antenna for the second RAT is enabled. The electronic device 101 may identify whether communication using the second RAT is active, i.e., if the second RAT is connected and the antenna is available. For example, even if communication using the second RAT is active, only an antenna not interfering with the antenna for the first RAT may be used, and thus it may be necessary to identify which antenna for the second RAT is being used.

According to an embodiment, if the antenna for the second RAT is not enabled (603-NO), the electronic device 101 may select the first mode optimized for the first RAT in operation 605. Since the antenna for the second RAT is not interfering with the first RAT, the setting of the antenna tuner connected to the antenna for the second RAT may not affect the performance of the first RAT. Thus, the electronic device 101 may select the first mode for maximizing the performance of the first RAT.

According to an embodiment, if the antenna for the second RAT is enabled (603-YES), the electronic device 101 may identify whether a voice/video call is used in operation 607. Since the antenna for the second RAT is enabled, the electronic device 101 may select the mode of the antenna tuner by considering the performance of the second RAT. The voice/video call serviced using the second RAT may be set to have the highest priority, and the electronic device 101 may identify whether the voice/video call is serviced using the second RAT.

According to an embodiment, if the voice/video call is used using the second RAT (607-YES), the electronic device 101 may select the second mode optimized for the second RAT in operation 609. Since the voice/video call is serviced using the second RAT of the highest priority, the electronic device 101 may select the second mode for maximizing the performance the second RAT. According to an embodiment, when selecting the second mode, the electronic device 101 may control the antenna tuner (e.g., the impedance tuner 390 and/or the aperture tuner 394) connected to the antenna for the first RAT to minimize interference. For example, when selecting the second mode, the electronic device 101 may optimize the second RAT by changing the mode of the antenna tuner for the first RAT to the setting which increases the isolation from the antenna for the second RAT.

According to an embodiment, if the voice/video call using the second RAT is not used (607-NO), the electronic device 101 may identify whether the first RAT is used for voice over Internet protocol (VoIP) or a high-priority application (e.g., a drone control application, a camera control application, a navigation application, or other applications requiring low latency) in operation 611. The VoIP or the high-priority application may be defined to have the next highest priority from the voice/video call using the second RAT, which has the highest priority. Hence, if the voice/video call using the second RAT is not used, the electronic device 101 may identify whether a service defined with the next priority is provided using the first RAT.

According to an embodiment, if the VoIP or the high-priority application using the first RAT is used (611-YES), the electronic device 101 may select the first mode optimized for the first RAT in operation 613. Since the VoIP or the high-priority application using the first RAT has a higher priority than other services using the second RAT, the electronic device 101 may first consider the performance of the first RAT. Hence, the electronic device 101 may select the first mode for maximizing the performance of the first RAT.

According to an embodiment, if the VoIP or the high-priority application using the first RAT is not used (611-NO), the electronic device 101 may select the third mode in operation 615. The third mode may be any one of modes other than the first mode and the second mode. If the VoIP or the high-priority application using the first RAT is not used, the service using the first RAT and the service using the second RAT have the same priorities and accordingly the electronic device 101 may select a mode that is not optimized only for one of the first RAT or the second RAT.

In the embodiment of FIG. 6, if the voice/video call using the second RAT is not provided and the VoIP or the high-priority application using the first RAT is not used, the third mode may be selected. According to another embodiment, if the voice/video call using the second RAT is not provided and the VoIP or the high-priority application using the first RAT is not used, the first mode may be selected.

In the embodiment of FIG. 6, the second mode may be selected according to whether the voice/video call using the second RAT is provided. According to another embodiment, the second mode may be selected according to a channel quality of the second RAT. For example, if a communication environment of the second RAT includes a weak electric field, the electronic device 101 may select the second mode. For example, the electronic device 101 may determine the weak electric field environment if the receive signal strength falls below a first threshold or the transmit power exceeds a second threshold. For example, the receive signal strength may be expressed using at least one of reference signal received power (RSRP), signal and noise ratio (SNR), received signal strength indicator (RSSI), received signal code power (RSCP), or signal to interference and noise ratio (SINR).

In the embodiment of FIG. 6, the second mode may be selected according to whether the voice/video call using the second RAT is provided. According to another embodiment, instead of the voice/video call, an IP multimedia subsystem (IMS) message service may be used to select the second mode.

Figure 7:
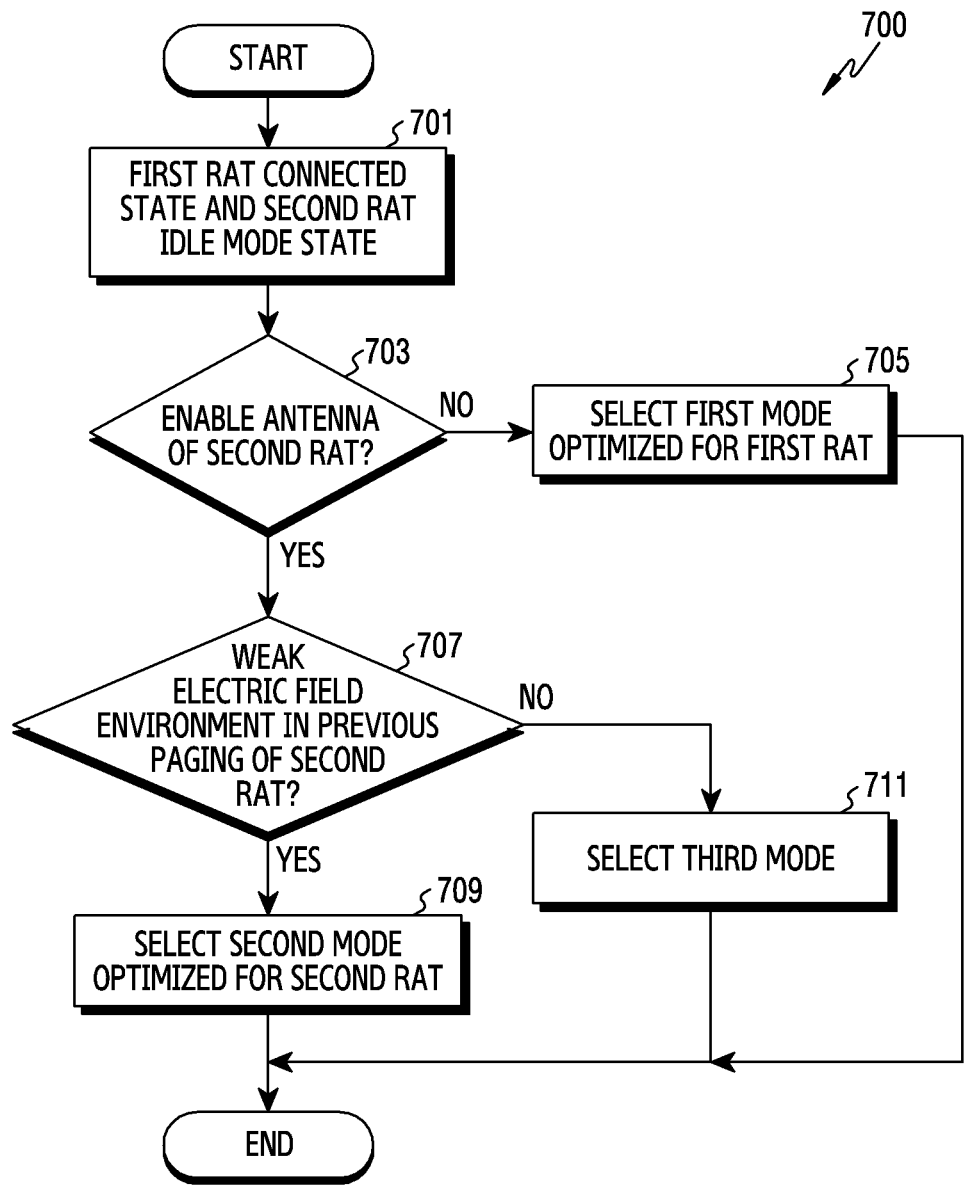
FIG. 7 is a flowchart illustrating the controlling of antenna characteristics while a second RAT is idle in an electronic device according to an embodiment of the disclosure.

FIG. 7 is a flowchart illustrating the controlling of antenna characteristics while a second RAT is idle in an electronic device according to an embodiment of the disclosure. The flowchart 700 of FIG. 7 is an embodiment for determining the operation mode of the antenna tuner of the antenna for the second RAT, and the operation entity of the flowchart 700 may be the electronic device 101 or the component (e.g., the processor 120) of the electronic device 101.

Referring to FIG. 7, according to an embodiment, in operation 701, the electronic device 101 (or the processor 120) may operate in the connected state for the first RAT and in the idle mode for the second RAT. In the idle mode of the second RAT, for the second RAT, the electronic device 101, which may be in a sleep state, may wake up at specific intervals and then determine whether to perform paging.

According to an embodiment, in operation 703, the electronic device 101 may identify whether the antenna for the second RAT is to be enabled. The electronic device 101 may identify whether communication using the second RAT need to be activated. But even if communication using the second RAT is activated, only an antenna not interfering in the antenna for the first RAT may be used. Thus it may be necessary to identify whether the antenna for the second RAT used is interfering in the antenna for the first RAT. Since the second RAT is in the idle mode, the antenna for the second RAT may be only activated to conduct paging operations with the network.

According to an embodiment, if the antenna for the second RAT is not enabled (703-NO), the electronic device 101 may select the first mode optimized for the first RAT in operation 705. Since the antenna for the second RAT is not used, the setting of the antenna tuner connected to the antenna for the first RAT may not affect the performance of the second RAT. Hence, the electronic device 101 may select the first mode for maximizing the performance of the first RAT.

According to an embodiment, if the antenna for the second RAT is enabled (703-YES), the electronic device 101 may identify whether communication environment of previous paging of the second RAT is in a weak electric field environment in operation 707. The weak electric field may indicate that the channel quality below a threshold is measured. For example, the electronic device 101 may determine the weak electric field environment, if a receive signal strength falls below a first threshold or a transmit power exceeds a second threshold.

According to an embodiment, if the previous paging is in the weak electric field communication environment (707-YES), the electronic device 101 may select the second mode optimized for the second RAT in operation 709. Since the previous paging is in the weak electric field, it is highly likely that current paging is also in the weak electric field. Thus, the electronic device 101 may prioritize the performance of the second RAT in order to overcome the weak electric field. According to an embodiment, when selecting the second mode, the electronic device 101 may control the antenna tuner (e.g., the impedance tuner 390 and/or the aperture tuner 394) connected to the antenna for the first RAT. For example, when selecting the second mode, the electronic device 101 may optimize the second RAT, by changing the mode of the antenna tuner for the first RAT to the setting which increases the isolation from the antenna for the second RAT.

According to an embodiment, if the previous paging is not in the weak electric field communication environment (707-NO), the electronic device 101 may select the third mode in operation 711. The third mode may be another mode other than the first mode and the second mode. Even though the previous paging is not in the weak electric field communication environment, since the paging is related to transition to the connected mode of the second RAT and the performance may not excluded, the electronic device 101 may balance the performance of the first RAT and the second RAT.

In the embodiment of FIG. 7, if the previous paging of the second RAT is not in the weak electric field, the third mode may be selected. According to another embodiment, if the previous paging of the second RAT is not in the weak electric field, the electronic device 101 may select the first mode. According to yet another embodiment, if the previous paging of the second RAT is not in the weak electric field, the electronic device 101 may select the first mode in response to a strong electric field of the previous paging and select the third mode in response to no strong electric field.

Figure 8:
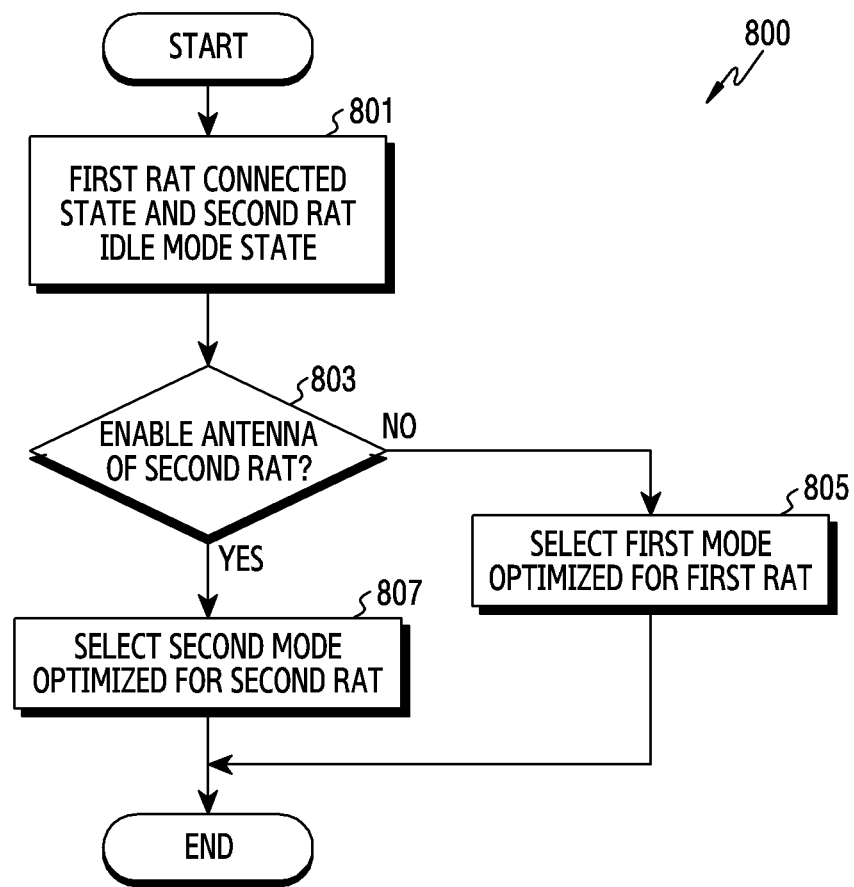
FIG. 8 is another flowchart illustrating the controlling of antenna characteristics while a second RAT is idle in an electronic device according to an embodiment of the disclosure.

FIG. 8 is another flowchart illustrating the controlling of antenna characteristics while a second RAT is idle in an electronic device according to an embodiment of the disclosure. The flowchart 800 of FIG. 8 is an embodiment for determining the operation mode of the antenna tuner of the antenna for the second RAT, and the operation entity of the flowchart 800 may be the electronic device 101 or the component (e.g., the processor 120) of the electronic device 101.

Referring to FIG. 8, according to an embodiment, in operation 801, the electronic device 101 (or the processor 120) may operate in the connected state for the first RAT and in the idle mode for the second RAT. In the idle mode of the second RAT, for the second RAT, the electronic device 101, which may be in a sleep state, may wake up at specific intervals and then determine whether to page.

According to an embodiment, in operation 803, the electronic device 101 may identify whether the antenna for the second RAT is to be enabled. The electronic device 101 may identify whether communication using the second RAT should be activated. But even if communication using the second RAT is activated, only an antenna not interfering in the antenna for the first RAT may be used. Thus it may be necessary to identify whether the antenna for the second RAT used is interfering in the antenna for the first RAT. Since the second RAT is in the idle mode, the antenna for the second RAT may be only activated to conduct paging operations with the network.

According to an embodiment, if the antenna for the second RAT is not enabled (803-NO), the electronic device 101 may select the first mode optimized for the first RAT in operation 805. Since the antenna for the second RAT is not interfering with the first RAT, the setting of the antenna tuner connected to the antenna for the first RAT may not affect the performance of the second RAT. Hence, the electronic device 101 may select the first mode for maximizing the performance of the first RAT.

According to an embodiment, if the antenna for the second RAT is enabled (803-YES), the electronic device 101 may select the second mode optimized for the second RAT in operation 807. Since the paging is related to the mode transition of the second RAT, loss of a paging message may greatly affect the communication performance. Hence, to improve the second RAT performance in the paging, the electronic device 101 may select the second mode. According to an embodiment, if selecting the second mode, the electronic device 101 may control the antenna tuner (e.g., the impedance tuner 390 and/or the aperture tuner 394) connected to the antenna for the first RAT. For example, when selecting the second mode, the electronic device 101 may optimize the second RAT, by changing the mode of the antenna tuner for the first RAT to the setting which increases the isolation from the antenna for the second RAT.

Figure 9:
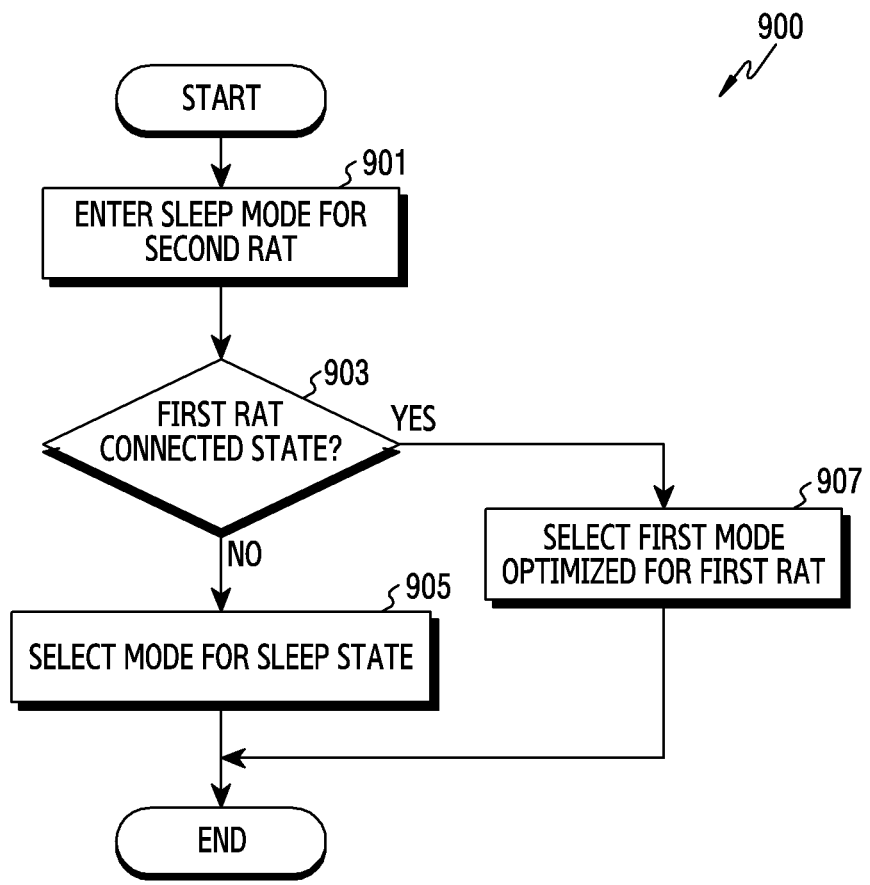
FIG. 9 is a flowchart illustrating the controlling of antenna characteristics while a second RAT is sleeping in an electronic device according to an embodiment of the disclosure.

FIG. 9 is a flowchart illustrating the controlling of antenna characteristics while a second RAT is sleeping in an electronic device according to an embodiment of the disclosure. The flowchart 900 of FIG. 9 is an embodiment for determining the operation mode of the antenna tuner of the antenna for the second RAT, and the operation entity of the flowchart 900 may be the electronic device 101 or the component (e.g., the processor 120) of the electronic device 101.

Referring to FIG. 9, according to an embodiment, in operation 901, the electronic device 101 (or the processor 120) may enter a sleep state for the second RAT. The sleep state (or idle mode) suspends communication, and the electronic device 101 may reduce power consumption by deactivating at least part of hardware components for the communication of the second RAT in the sleep state.

According to an embodiment, in operation 903, the electronic device 101 may identify whether the first RAT is in the connected state. The electronic device 101 may identify whether communication is performed using the first RAT.

According to an embodiment, if the first RAT is not in the connected state (903-NO). The electronic device 101 may select a mode for the sleep state in operation 905. Since the first RAT is not connected, the performance of the first RAT need not be considered. Hence, the electronic device 101 may select the mode of the antenna tuner, without considering the first RAT. For example, the electronic device 101 may select a mode for minimizing the power consumption. The mode for minimizing the power consumption may be different from a mode optimized for the isolation.

According to an embodiment, if the first RAT is in the connected state (903-YES), the electronic device 101 may select the first mode optimized for the first RAT in operation 907. Since communication using the second RAT is not performed but the communication using the first RAT is conducted, the electronic device 101 may first consider the performance of the first RAT in spite of the power consumption. The first mode may cause the same power consumption as in the connected state of the second RAT, buy may achieve high isolation.

Figure 10:
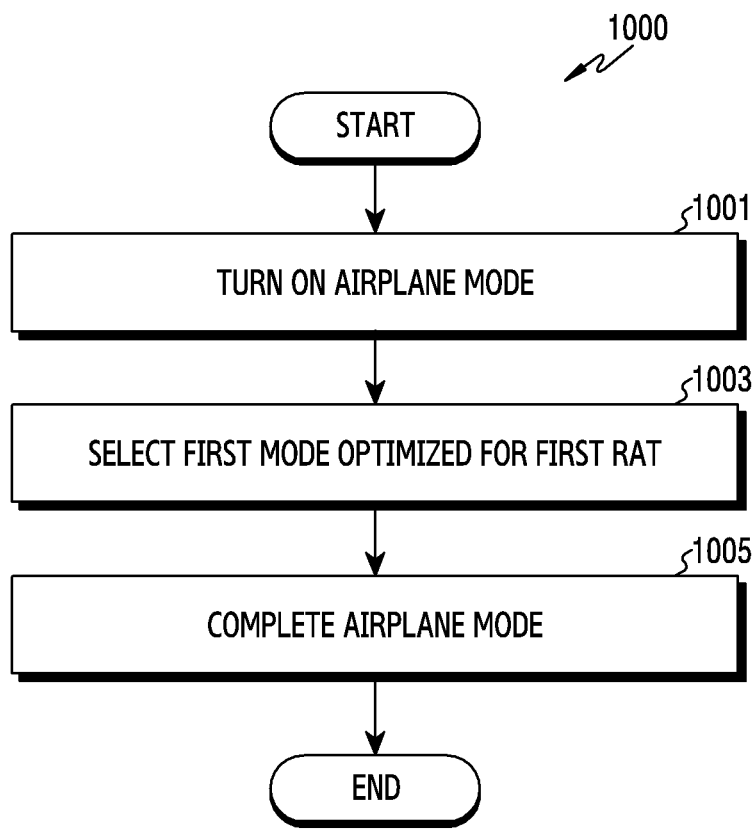
FIG. 10 is a flowchart illustrating the controlling of antenna characteristics in an airplane mode in an electronic device according to an embodiment of the disclosure.

FIG. 10 is a flowchart illustrating the controlling of antenna characteristics in an airplane mode in an electronic device according to an embodiment of the disclosure. The flowchart 1000 of FIG. 10 is an embodiment for determining the operation mode of the antenna tuner of the antenna for the second RAT, and the operation entity of the flowchart 1000 may be the electronic device 101 or the component (e.g., the processor 120) of the electronic device 101.

Referring to FIG. 10, according to an embodiment, in operation 1001, the electronic device 101 (or the processor 120) may turn on an airplane mode. The airplane mode blocks the communication function of the electronic device 101, and the communication function using the first RAT may be selectively turned on/off.

According to an embodiment, in operation 1003, when the first RAT is selectively turned on, the electronic device 101 may select the first mode optimized for the first RAT. Since the communication function using the second RAT is blocked in the airplane mode, the electronic device 101 may consider the performance of the first RAT without considering the performance of the second RAT.

According to an embodiment, in operation 1005, the electronic device 101 may complete the airplane mode. The electronic device 101 may set the antenna tuner to the first mode, and block the communication function using the second RAT.

According to an embodiment of the disclosure, a method for operating an electronic device (e.g., the electronic device 101) may include identifying communication states related to a first RAT and a second RAT, determining a mode of a tuner which controls characteristics of an antenna for the second RAT, based on the communication states, and controlling the tuner according to the mode.

According to an embodiment of the disclosure, the communication state related to the first RAT may include at least one of whether a communication function of the first RAT is activated, an operation mode of the first RAT, an application serviced using the first RAT, electric field strength of the first RAT, or whether an antenna for the first RAT is enabled.

According to an embodiment of the disclosure, the first RAT may include wireless local area network, Bluetooth, or GPS, and the second RAT may include a cellular communication technology.

According to an embodiment of the disclosure, determining the mode of the tuner may include, if the first RAT is connected, the antenna for the second RAT is enabled, and a voice or video call service is provided using the second RAT, selecting a mode which maximizes performance of the second RAT.

According to an embodiment of the disclosure, determining the mode of the tuner may include, if the first RAT is connected, the antenna for the second RAT is enabled, and a communication environment of the second RAT is a weak electric field, selecting a mode which maximizes performance of the second RAT.

According to an embodiment of the disclosure, determining the mode of the tuner may include, if the first RAT is connected, the antenna for the second RAT is enabled, a voice or video call service is not provided using the second RAT, and a voice over Internet protocol (VoIP) is provided using the first RAT, selecting a mode which maximizes performance of the first RAT.

According to an embodiment of the disclosure, determining the mode of the tuner may include, if the first RAT is connected, the second RAT is idle, the antenna for the second RAT is enabled, and a communication environment in previous paging of the second RAT is a weak electric field, selecting a mode which maximizes performance of the second RAT.

According to an embodiment of the disclosure, determining the mode of the tuner may include, if the first RAT is connected, the second RAT is idle, and the antenna for the second RAT is not enabled, selecting a mode which maximizes performance of the first RAT.

According to an embodiment of the disclosure, determining the mode of the tuner may include, if the first RAT is connected, the second RAT is idle, the antenna for the second RAT is enabled, and a communication environment in previous paging of the second RAT is not a weak electric field, selecting one of at least one other mode other than a first mode which maximizes performance of the first RAT and a second mode which maximizes performance of the second RAT.

According to an embodiment of the disclosure, determining the mode of the tuner may include, if the first RAT is connected, the second RAT is idle, and the antenna for the second RAT is enabled, selecting a mode which maximizes performance of the second RAT.

According to an embodiment of the disclosure, determining the mode of the tuner may include, if the second RAT is in a sleep state and the first RAT is connected, selecting a mode which maximizes performance of the first RAT.

According to an embodiment of the disclosure, determining the mode of the tuner may include, if the electronic device (e.g., the electronic device 101) operates in an airplane mode, selecting a mode which maximizes performance of the first RAT.

A method and an electronic device according to certain embodiments may further improve communication performance, by controlling characteristics of antennas in consideration of interference between antennas.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor(e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. A method for operating an electronic device, comprising:
   performing a first communication of a first radio access technology (RAT) through a first antenna of the electronic device, the first RAT including wireless local area network, Bluetooth, or global positioning system (GPS),
   identifying whether performing of a second communication of a second RAT through a second antenna of the electronic device interferes with the first communication through the first antenna, the second RAT including a cellular communication,
   if performing of the second communication interferes with the first communication, identifying a first communication state related to the first RAT and a second communication state related to the second RAT;
   determining a mode of a tuner configured to control impedances of the second antenna for the second RAT, based on both the first communication state and the second communication state; and controlling the tuner according to the mode, wherein the mode of the tuner includes:
a first mode in which the impedance of the second antenna is optimized for performing the first communication through the first antenna, and
a second mode in which the impedance of the second antenna is optimized for performing the second communication.

2. The method of claim 1, wherein the first communication state related to the first RAT comprises whether a communication function of the first RAT is activated, an operation mode of the first RAT, an application serviced using the first RAT, electric field strength of the first RAT, or whether the first antenna for the first RAT is enabled.

3. The method of claim 1, wherein the determining of the mode of the tuner comprises:
when the first RAT is connected, the second antenna for the second RAT is enabled, and a voice or video call service is provided using the second RAT, selecting the second mode which maximizes performance of the second RAT.

4. The method of claim 1, wherein the determining of the mode of the tuner comprises:
when the first RAT is connected, the second antenna for the second RAT is enabled, and a communication environment of the second RAT is a weak electric field, selecting the second mode which maximizes performance of the second RAT.

5. The method of claim 1, wherein the determining of the mode of the tuner comprises:
when the first RAT is connected, the second antenna for the second RAT is enabled, a voice or video call service is not provided using the second RAT, and a voice over Internet protocol (VoIP) service is provided using the first RAT, selecting the first mode which maximizes performance of the first RAT.

6. The method of claim 1, wherein the determining of the mode of the tuner comprises:
when the first RAT is connected, the second RAT is idle, the second antenna for the second RAT is enabled, and a communication environment in previous paging of the second RAT is a weak electric field, selecting the second mode which maximizes performance of the second RAT.

7. The method of claim 1, wherein the determining of the mode of the tuner comprises:
when the first RAT is connected, the second RAT is idle, and the second antenna for the second RAT is not enabled, selecting the first mode which maximizes performance of the first RAT.

8. The method of claim 1, wherein the determining of the mode of the tuner comprises:
when the first RAT is connected, the second RAT is idle, the second antenna for the second RAT is enabled, and a communication environment in previous paging of the second RAT is not a weak electric field, selecting a third mode other than the first mode which maximizes performance of the first RAT and the second mode which maximizes performance of the second RAT.

9. The method of claim 1, wherein the determining of the mode of the tuner comprises:
when the first RAT is connected, the second RAT is idle, and the second antenna for the second RAT is enabled, selecting the second mode which maximizes performance of the second RAT.

10. The method of claim 1, wherein the determining of the mode of the tuner comprises:
when the second RAT is in a sleep state and the first RAT is connected, selecting the first mode which maximizes performance of the first RAT.

11. The method of claim 1, wherein the determining of the mode of the tuner comprises:
when the electronic device operates in an airplane mode, selecting the first mode which maximizes performance of the first RAT.

12. An electronic device comprising:
a first communication circuit configured to perform a first communication of a first radio access technology (RAT);
a second communication circuit configured to perform a second communication of a second RAT;
a first antenna for the first RAT comprising wireless local area network, Bluetooth, or global positioning system (GPS);
a second antenna for the second RAT comprising a cellular communication technology;
a tuner configured to control impedance corresponding to the first antenna and/or the second antenna; and
a processor electrically connected with the first communication circuit and the second communication circuit,
wherein the processor is configured to:
perform the first communication through the first antenna,
identify whether performing of the second communication through the second antenna interferes with the first communication through the first antenna,
if performing of the second communication through the second antenna interferes with the first communication through the first antenna, identify a first communication state related to the first RAT and a second communication state related to the second RAT,
determine a mode of a tuner based on both the first communication state and the second communication state, wherein the mode of the tuner includes:
a first mode in which the impedance of the second antenna is optimized for performing the first communication through the first antenna, and
a second mode in which the impedance of the second antenna is optimized for performing the second communication, and
control the tuner according to the mode.

13. The electronic device of claim 12, wherein, when the first RAT is connected, the second antenna is enabled, and a voice or video call service is provided using the second RAT, the processor is configured to select the second mode which maximizes performance of the second RAT.

14. The electronic device of claim 12, wherein, when the first RAT is connected, the second antenna is enabled, and a communication environment of the second RAT is a weak electric field, the processor is configured to select the second mode which maximizes performance of the second RAT.

15. The electronic device of claim 12, wherein, when the first RAT is connected, the second antenna is enabled, a voice or video call service is not provided using the second RAT, and a voice over Internet protocol (VoIP) service is provided using the first RAT, the processor is configured to select the first mode which maximizes performance of the first RAT.

16. The electronic device of claim 12, wherein, when the first RAT is connected, the second RAT is idle, the second antenna is enabled, and a communication environment in previous paging of the second RAT is a weak electric field, the processor is configured to select the second mode which maximizes performance of the second RAT.

17. The electronic device of claim 12, wherein, when the first RAT is connected, the second RAT is idle, and the second antenna is not enabled, the processor is configured to select the first mode which maximizes performance of the first RAT.

18. The electronic device of claim 12, wherein, when the first RAT is connected, the second RAT is idle, the second antenna is enabled, and a communication environment in previous paging of the second RAT is not a weak electric field, the processor is configured to select a third mode other than the first mode which maximizes performance of the first RAT and the second mode which maximizes performance of the second RAT.

* * * * *